United States Patent Office 3,462,323

Patented Aug. 19, 1969

3,462,323

PROCESS FOR THE PREPARATION OF COMPOUND SEMICONDUCTORS

Warren O. Groves, Des Peres, Mo., assignor to Monsanto Company, St. Louis, Mo., a corporation of Delaware No Drawing. Filed Dec. 5, 1966, Ser. No. 598,971
Int. Cl. H01l 7/36
U.S. Cl. 148—175 14 Claims

ABSTRACT OF THE DISCLOSURE

Compound semiconductors either as compounds per se or as epitaxial films on suitable substrates are prepared and deposited from vapor mixtures thereof with a halogenated hydrocarbon, e.g., trichloroethylene, as the transfer agent therefor. Compound semiconductor materials prepared according to the invention include the nitrides, phosphides, arsenides and antimonides of boron, aluminum, gallium and indium and mixed crystal alloys thereof and the sulfides, selenides and tellurides of beryllium, zinc, cadmium, mercury and mixed crystal alloys thereof. The semiconductor materials may be doped or undoped to control electrical properties.

BACKGROUND OF THE INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

This invention pertains to the field of compound semiconductor preparation and deposition thereof from the vapor phase.

The preparation of compound semiconductors as described in the prior art includes the use of various materials as transport or transfer agents for compound semiconductors or components thereof. For example, water vapor, elemental halogens, hydrogen halides, phosphorus halides, arsenic halides, metal halides and metal alkyl compounds have been employed as the transfer agents or sources of transfer agents in the vapor deposition of compound semiconductors.

Among the problems encountered in the use of the above transport agents are difficulties in handling, ease of contamination, corrosiveness and undesirable by-products.

SUMMARY OF THE INVENTION

According to the present invention compound semiconductors, including binary compounds or mixed crystals thereof are prepared and vapor deposited either as compounds, per se, or alloys thereof or as epitaxial films thereof on various substrates by means of a halogenated hydrocarbon as the transport agent.

A superior feature of halogenated hydrocarbons as used herein is most notably their inert character with respect to the apparatus in which the reactions are carried out as well as with respect to the reactants. The advantages of this feature are that the problem of contamination of the semiconductor material due to corrosion of reaction apparatus is essentially eliminated and that the materials used in the reaction apparatus may be made of less expensive materials. Moreover, since the halogenated hydrocarbon do not react with the components of the compound semiconductor and produce undesirable or useless by-products, higher yields of the compound semiconductor are made possible than with transport agents which react with the semiconductor components and detract from the yield of semiconductor product.

Still another superior feature of the use of halogenated hydrocarbons herein is the flexibility with which they may be used in compound vapor deposition processes. As will be discussed more fully below, these materials may be used directly as transport agents for compound semiconductors to a deposition zone or they may be used as the reaction media in and with which the semiconductor components or reactive species thereof are formed and/or transported to a deposition zone for the compound semiconductor product.

In one embodiment, the instant invention comprises mixing a halogenated hydrocarbon such as trichloroethylene with a carrier stream of hydrogen at about 0° C. Passing this stream through a heated furnace to cause partial decomposition of the halogenated hydrocarbon and introducing into this mixture a quantity of the more volatile component of the compound semiconductor subsequently formed. The more volatile component may be in elemental form or in the form of a volatile compound of the element, e.g., as halides, hydrides or alkyl compounds. The mixture of partially decomposed halogenated hydrocarbon and more volatile semiconductor component is then passed over a quantity of the less volatile component of the semiconductor to be formed at a temperature sufficiently high to form a reactive species of the less volatile component which, together with the more volatile components in said mixture, is then passed into a zone of reduced temperature wherein a compound semiconductor comprising said less volatile and more volatile components is deposited in pure, single crystal form either as a compound, per se, or as an epitaxial film on a crystallographically compatible substrate located in said zone of reduced temperature.

A modification of the above embodiment of the invention involves first contacting the partially decomposed halogenated hydrocarbon-hydrogen stream with said less volatile component to form a reactive species of that component and then introducing into the mixture thus formed a quantity of the more volatile component of the compound semiconductor to be formed and passing the reaction mixture into a zone of reduced temperature wherein said compound semiconductor is deposited. In this embodiment considerably lower temperatures are required for the formation of the reactive species of the less volatile component of the compound semiconductor.

Another embodiment of the instant invention involves contacting the halogenated hydrocarbon transfer agent with a quantity of the compound semiconductor in crude or impure or polycrystalline form in a reaction zone at temperatures and pressures sufficient to form a complex vapor mixture which is then conducted to a cooler deposition zone wherein the original compound is reconstituted or reformed and deposits in very pure single crystal form.

The compound semiconductors of this invention, preferably in the form of epitaxial films on suitable substrates, have utility in the preparation of a variety of semiconductor devices including but not limited to rectifiers, tunnel diodes, transistors, solar cells, parametric amplifiers, radiation detectors, electroluminescent diodes, lasers, components in micromodule circuits, optical filters, watt-meters, thermogenerators and the like.

It is an object of this invention to provide a new and economical method for the production of compound semiconductors.

A further object of this invention is to provide a novel class of transport agents for the preparation and vapor deposition of compound semiconductors either as compounds, per se, or as epitaxial films comprising III–V compounds and mixed crystal alloys thereof and II–VI compounds and mixed crystal alloys thereof, wherein said transport agents are halogenated hydrocarbons.

These and other objects will become apparent as the description proceeds.

DETAILED DESCRIPTION OF THE INVENTION

It has now been discovered that compound semiconductors may be prepared in and/or transported from a reaction zone of higher temperature to a deposition zone of lower temperature by means of halogenated hydrocarbons as the initial transport agent.

Compound semiconductors of primary interest herein are the III–V compounds and mixed crystals thereof and II–VI compounds and mixed crystals thereof. These compounds are sonamed from the groups in the periodic system whose elements form the compounds. Included among these compounds are the nitrides, phosphides, arsenides and antimonides of boron, aluminum, gallium and indium and mixed crystals thereof. Among the latter are mixed crystal alloys having the general formulae $III\text{–}V_xV_{1-x}$, $III_xIII_{1-x}V$ and $III_yIII_{1-y}V_xV_{1-x}$, where $x$ and $y$ are numerical values greater than zero and less than one. Exemplary mixed crystal alloys within the above formulae are $GaAs_xP_{1-x}$, $InAs_xP_{1-x}$, $GaP_xN_{1-x}$, $AlP_xAs_{1-x}$, $BP_xAs_{1-x}$, $Ga_xIn_{1-x}As$, $Ga_xIn_{1-x}P$, $In_xGa_{1-x}Sb$, $Ga_xAl_{1-x}P$, $Ga_xIn_{1-x}As_yP_{1-y}$, $Ga_xAl_{1-x}P_yAs_{1-y}$, $B_xAl_{1-x}P_yN_{1-y}$ and the like. Also included as compound semiconductors herein are the sulfides, selenides and tellurides of beryllium, magnesium, zinc, cadmium and mercury and mixed crystals thereof having the general formulae $II\text{–}VI_xVI_{1-x}$, $II_xII_{1-x}VI$ and $II_yII_{1-y}VI_xVI_{1-x}$, and $x$ and $y$ have the values noted above. Exemplary mixed single crystal alloys within these general formulae are $CdSe_xTe_{1-x}$, $BeS_xSe_{1-x}$, $MgSe_xTe_{1-x}$, $HgS_xTe_{1-x}$, $ZnS_xTe_{1-x}$, $Be_xZn_{1-x}S$, $Zn_xCd_{1-x}Se$, $Cd_xHg_{1-x}Te$, $Zn_xCd_{1-x}Te_{1-y}$, $Cd_xHg_{1-x}S_ySe_{1-y}$, $Cd_xZn_{1-x}S_yTe_{1-y}$ and the like.

A wide variety of halogenated hydrocarbons are suitable for use herein. Such compounds include halogenated aliphatic hydrocarbons, both saturated and unsaturated, cycloaliphatic and aromatic hydrocarbons. Particularly suitable are the bromides, chlorides and iodides of these hydrocarbons. The halogenated hydrocarbons especially preferred herein are those having from 1 to 10 carbon atoms and a halogen-to-carbon ratio within the range of from 1:1 to 4:1. Halogenated hydrocarbons having a halogen-to-carbon ratio within the range of from 1:1 to 1:6 are also useful herein although less preferred. In any case the halogenated hydrocarbon should be in the gaseous form at the deposition temperature. Exemplary halogenated saturated aliphatic hydrocarbons are the alkyl halides such as methyl chloride, ethyl iodide, propyl bromide and the like and other bromides, chlorides and iodides of the alkane series such as carbon tetrachloride, -tetraiodide and -tetrabromide, chloroethane, dibromoethane, trichloroethane, trichlorobromomethane, tetrabromoethane, hexachloropropane, 1,1,2-triidopropane, octachloropropane, 1,2 - dibromobutane, 4,4,5,5 - tetrabromo - 2,2,3 - trimethylpentane, heptachloroheptane, 1-chloro-1-bromodecane, decachlorobutane, dodecachlorodecane and the like. Exemplary halogenated unsaturated aliphatic hyydrocarbons are bromoethlene, trichloroethylene, tribromoethylene, 1,1-dichloro - 2,2 - dibromoethylene, 1,1,2 - tribromopropene, 1,1,2,3 - tetraiodopropene, dichloroacetylene, iodoacetylene, 1,2,3,4,5,6-hexabromohexene-1, 2-chlorobutadiene-1,3, 1,2-dichlorobutadiene-1,3, octabromopentadiene-1,3 and the like. Exemplary halogenated cycloaliphatic hydrocarbons are hexachlorocyclopropane, 1,2,3,4-tetrabromocyclobutane, octachlorocyclobutane, 2,3-dibromocyclopentene-4,5, hexaiodocyclohexene - 2,3, decachlorocyclohexane, dodecachlorohexane and the like. Exemplary halogenated aromatic hydrocarbons are chlorobenzene, o-, m- and p-chlorobromobenzenes, triiodobenzene, hexachlorobenzene, o-, m- and p-dibromoxylenes, octachloronaphthalene, 1,2-dichloronaphthalene and the like. It will be understood of course that mixtures of two or more halogenated hydrocarbons may be used herein as well as individual compounds.

As indicated above the simplest embodiment of the instant invention involves contacting the gaseous halogenated hydrocarbon, preferably in a carrier stream of hydrogen, with a source of the compound semiconductor in impure and/or polycrystalline form in a reaction zone at temperatures and pressures sufficiently high to form a gaseous reaction mixture of the semiconductor compound and the halogenated hydrocarbon and then passing this reaction mixture into a deposition zone. In general, the temperature of the deposition zone is lower than that in the reaction zone. However, an exception to this generality involves the compound boron phosphide which requires a higher temperature in the deposition zone than in the reaction zone.

The flexibility of the instant process is illustrated by those embodiments of the invention wherein the halogenated hydrocarbon is used as transport agent for one or more of the semiconductor components or reactive species to the location in the reaction system of the other semiconductor component(s) or reactive species, wherein the halogenated hydrocarbon serves both as a reaction medium and as a transport agent for the entire complex reaction mixture which is then conducted to the deposition zone wherein the compound semiconductor is deposited on cooler surfaces such as various substrate materials and/or the walls of the deposition tube. In this embodiment of the invention the semiconductor components or reactive species thereof carried by the halogenated hydrocarbon may be introduced into the reaction system comprising a single tube reactor of suitable material such as glass, quartz, ceramic and the like. Alternatively, the semiconductor components or reactive species thereof may be independently synthesized in separate reactors and conducted through separated conduits to a common reaction zone for combination of all reactive species or components of the compound semiconductor and the entire mixture transported to the deposition zone of the system wherein the compound semiconductor product is deposited. The further flexibility of this embodiment is shown by the fact that the individual semiconductor components or reactive species thereof may be introduced into or incoropated into the halogenated hydrocarbon in any sequence for transport to the reaction and deposition zone. However, it is preferred to contact the transport agent first with the semiconductor component(s) having the lower volatility and then contacting this mixture with the component(s) having higher volatility, inasmuch as lower temperatures are required to form the reactive species of this component than when the reverse sequence is used, i.e., when the semiconductor component(s) having higher volatility are first incorporated into the transport agent and subsequently contacted with the semiconductor component having the lower volatility.

The apparatus employed in carrying out the process of the present invention may be any of a number of types. The simplest type constitutes a closed tube of a refractory material such as glass, quartz or a ceramic tube such as mullite into which the crude reactant materials are introduced together with the halogenated hydrocarbon vapor. The tube is then sealed off and subjected to temperatures within the range of from 135° C. to 1200° C. and, preferably, from 550° C. to 1000° C. in the high temperature reaction zone for a period of from less than one minute to one hour or more, until the reaction is complete. After the tube has thus been heated the reaction mixture is then passed into a deposition zone, usually a region of lower temperature sufficient to deposit the compound semiconductor, generally within the range of from 130° C. to 1195° C. and, preferably, from 545° C. to 995° C. It is essential in the preferred embodiment that a temperature differential be maintained between the respective higher and lower temperature zones, such temperature differential being from 5° C. to 1070° C., while a preferred differential is from 25° C. to 200° C.

It is to be understood that the temperature ranges recited herein are generic to the entire group of compounds disclosed, and that the specific temperatures employed in a given system will relate to and be determined by the specific compound involved. In brief, it is only necessary to heat the first temperature region or reaction zone to a temperature sufficiently high to enable the crude semiconductor compound or components thereof to react or combine with the halogenated hydrocarbon vapor. As to the temperature employed in the second temperature region or deposition zone, it is only necessary that it be lower than the temperature in the first temperature region by an amount sufficient to permit deposition of a single crystal form of the compound from the reaction mixture, an exception being the compound boron phosphide which requires a higher deposition temperature. Temperature differentials between the two temperature regions will be determined by the specific compound involved, but, in general, are within the range disclosed above.

On a larger scale, the present process is operated as a continuous flow system. This may constitute a simple tube in which the solid crude compound semiconductor source material is located and over which the halogenated hydrocarbon gas is then passed. At the higher temperatures set forth above, the gas stream passes along the same or an additional conduit to another region maintained at a lower temperature, as described above. For example, a silica tube located in a multiple-zone electric heating furnace or a two-furnace heating system may thus be employed to produce the first zone higher temperature followed by a zone of lower temperature in which the deposition from the vapor phase takes place to yield the purified single crystal product. The product is readily removed from the reactor since it is merely deposited from the gas phase as an epitaxial film on a substrate or as a mass along the walls of the tube. Various other modifications including horizontal and vertical tubes are also possible, and recycle systems in which the exit gas after deposition of the single crystal product is returned to the system is also desirable, particularly in larger scale installations. When using a continuous gas flow system in any of the embodiments herein, the halogenated hydrocarbon transport agent is suitably introduced at a rate of from 1 cc./min. to 1000 cc./min., or preferably, from 4 cc./min. to 28 cc./min. The pressure in the system may be varied over a considerable range such as from 0.01 to 10 atmospheres, a preferred range being from 0.5 to 2.0 atmospheres.

A particularly advantageous feature of the instant invention is the provision of a simple means of improving the purity of the various commercially important compounds described above.

The instant purification is based upon the use of inert halogenated hydrocarbons as transport agents. Since these materials are generally essentially inert under conditions in which they are stored, they are not contaminated with corrosion impurities as are many transport agents described in the prior art.

In addition to the purification feature of this invention, another important aspect is the provision of a means of preparing and depositing epitaxial films of the purified single crystal host material onto various substrates. These deposited films permit the fabrication of useful electronic devices mentioned above. The thickness of the epitaxial film may be controlled as desired and is dependent upon reaction conditions such as temperatures within the "hot" and "cold" zones of the reactor, temperature differentials between these zones, concentration of the transport agent and time. In general, the formation of large single crystals and thicker layers is favored by small temperature gradients as defined above, and small concentrations of the transport agent, i.e., from about 1 mm. to 20 mm. pressure for closed systems and in open systems a flow rate of from 1 cc./min. to 20 cc./min.

The substrate crystal may be oriented in any direction. However, epitaxial films having superior physical properties, such as smoother finish and better thickness uniformity, result when crystal growth proceeds on the (100), (111)A and (111)B crystallographic faces. The (111)B face is the (111) face having the Group V element exposed, e.g., in gallium arsenide the (111)B face has arsenic atoms exposed, whereas the (111)A face gallium atoms exposed. For II–VI compounds the (111)B face has the VI element exposed and the (111)A face has the II element exposed.

Materials useful as substrates herein include the same materials used in the epitaxial films as just described and, in addition, the elements silicon and germanium are suitable substrates.

As will be described hereinafter, the materials used herein either as films or substrates or both may be used in a purified state or containing small amounts of foreign material as "doping" agents.

The significance of structures having epitaxial films is that electronic devices utilizing "surface junctions" may readily be fabricated. Devices utilizing n-p or p-n junctions are readily fabricated by vapor depositing the host material containing the desired amount and kind of impurity hence, conductivity type upon a substrate having a different conductivity type. For example, in order to obtain a vapor deposit having the desired conductivity type and resistivity, the source (host) material, either the compound semiconductor, e.g., gallium arsenide, or its components is "doped" with the desired amount and kind of a foreign material to alter the electrical properties of the gallium arsenide. The desired amount of an element selected from Group II of the Periodic System, e.g., beryllium, magnesium, zinc, cadmium and mercury is incorporated into the gallium arsenide in order to produce p-type conductivity and an element from Group VI, e.g., selenium and tellurium, to produce n-type conductivity and are carried over with the host material in the vapor phase and deposited in a uniform dispersion in the epitaxial film of the host material on the substrate. Alternatively, or additionally, the impurity may be introduced into the substrate material and the single crystal form of the source material, purified or doped as desired, deposited thereon as an epitaxial film. The doping element may be introduced in any manner known in the art, for example, by chemical combination with or physical dispersion within the source material, its components or from an independent source. Vapor deposits of the purified material having the same conductivity type as the substrate may be utilized to form intrinsic $pp^+$ or $nn^+$ regions. In this embodiment no foreign impurities are intentionally introduced into the substrate or host material.

Variations of the preceding techniques permits the formation of devices having a plurality of layers of epitaxial films each having its own electrical conductivity type and resistivity as controlled by layer thickness and dopant concentration. Since the vapor deposited host material assumes the same lattice structure as the substrate wherever the two materials contact each other, small or large areas of the substrate may be masked from or exposed to the depositing host material. By this means one is able to obtain small regions of surface junctions or wide area films on the substrate for a diversity of electronic applications.

As mentioned above, a plurality of layers of epitaxial films may be deposited upon the substrate material. This is accomplished, e.g., by vapor depositing consecutive layers one upon the other. For example, a first film of one of the materials described herein, e.g., gallium arsenide is vapor deposited upon a substrate of germanium silicon or other material. Subsequently, a quantity of the same material with different doping agents or different concentrations of the same dopant or another of the described materials, e.g., gallium phosphide, may be placed into the hot region of the silica tube formerly occupied by the crude gallium arsenide. The crude gallium phosphide is then vapor deposited from the halogenated transport agent as a second epitaxial film over the epitaxial film of gallium arsenide already deposited on the substrate. This procedure with any desired combination of epitaxial and nonepitaxial layers can be repeated any number of times. Alternatively, after the first layer of material is vapor deposited upon the substrate, the substrate with this epitaxial layer is removed to another reactor containing a second source material which then is vapor deposited upon the substrate with its first epitaxial layer, thereby forming a two-layered component. In each of these processes and its modified embodiments the thickness of the film and the impurity concentration are controllable to obtain a variety of electrical effects required for specific purposes as discussed elsewhere herein.

The invention will be more fully understood with reference to the following nonlimitative illustrative specific embodiments.

Example 1

This example illustrates the preparation of a single crystal form of purified GaP in an open system arrangement.

A fused silica tube, 22 mm. outside diameter by 36" long, is placed in two adjacent 13" furnaces. Polycrystalline laboratory grade GaP (4.5 g.) is placed in the first of these furnaces. After flushing with argon, the furnace containing the GaP is heated to 860±10° C. Trichloroethylene at a rate of 9 cc./min. is then introduced into the tube and allowed to pass over the GaP. After 185 minutes, the furnaces are cooled down and argon admitted to remove traces of trichloroethylene. Approximately 0.6 gm. of GaP remain in the first furnace, with about 3.8 gm. of GaP being transported to the cooler area in the second furnace. This product is largely single crystal form. The temperature of the second furnace is maintained at about 660±20° C. This example is typical of the transport and deposition of III–V compounds, per se.

Example 2

This example illustrates the preparation of single crystal zinc selenide, ZnSe, in an open system and typifies the class of II–VI compounds.

The experimental arrangement is similar to that described in Example 1, that is, a fused silica tube, open at both ends, is placed in two adjacent furnaces and about 8.7 grams of laboratory grade polycrystalline ZnSe is charged to the tube. The furnace containing the ZnSe is heated to about 650° C. and the second furnace is heated to from 580–600° C. Carbon tetrachloride at a rate of 22 cc./min. is passed over the ZnSe for 75 minutes. Approximately 4.9 gm. of the original charge are transported from the hot region of the first furnace. In this type of experiment, up to 50% of the ZnSe which is transported from the higher temperature region is recovered in the cooler furnace.

Example 3

This example illustrates the formation and deposition of an epitaxial film of p-type GaP on n-type GaAs as the substrate.

Using the experimental arrangement described in Examples 1 and 2 approximately 8.9 gm. of polycrystalline p-type GaP, doped with zinc to a level of about $1\times10^{20}$ carriers/cc., is placed in a fused silica tube located in two adjacent furnaces. The substrate, an n-type GaAs wafer doped with tellurium to a net carrier level of about $5.8\times10^{18}$ carriers/cc., is placed in the silica tube in the deposition zone maintained at about 625° C. The reaction zone containing the GaP is heated to about 700° C. The substrate wafer weighs approximately 3.0 gm. prior to the experiment. Trichloromethane at a rate of about 10 cc./min. is passed through the tube for about 5 hours. When the seed wafer is reweighed it is found that about 0.6 gm. of GaP has been deposited on the surfaces of the substrate. X-ray diffraction patterns of the substrate wafer show that the deposit is single crystal and oriented in the same fashion as the substrate. Point contact rectification tests show that a p-n junction exists at the region of the junction between the epitaxial layer and the substrate.

Example 4

This example illustrates the deposition of an p-type epitaxial layer of cadmium sulfide, CdS, on an n-type substrate of aluminum arsenide, AlAs.

The CdS source in this experiment is about 9.7 gm. of polycrystalline p-type material doped with zinc to a net carrier level of $1–2\times10^{18}$ carriers/cc. The seed wafer substrate is single crystal n-type AlAs doped with tellurium to a net carrier level of about $1\times10^{17}$ atoms/cc. and oriented (111)A. The reaction zone containing the CdS was heated to about 1000° C. and the deposition zone to about 975° C. Octachlorocyclopentane vapor is flowed through the tube at a rate of 10–30 cc./min. for about 3 hours. The seed wafer is re-weighed and found to have gained about 0.4 gm. of deposited CdS. The side of the wafer holding the thinner deposit is epitaxial, the X-ray diffraction diagram showing the same orientation as the substrate wafer.

Example 5

This example illustrates the preparation of mixed single crystals of GaP and GaAs from a polycrystalline mixture of the same.

Laboratory grade GaAs and GaP, in arsenic to phosphorus ratios of 6 to 4 is charged to an open end tube, as described in previous examples. Texachlorobenzene is vaporized and, at a flow rate of 10–20 cc./min., is passed through the tube for about 3 hours. The GaAs-GaP mixture is maintained at 800° C. in the hotter region of the tube and the cooler region at 650° C. The mixture deposits in single crystal form in the cooler region and is found to transmit red light. Optical absorption measurements indicate that the forbidden energy gap is about 1.9 ev., indicating that the starting ratio of As to P of 6:4 is maintained in the deposit material.

When this example is repeated using a p-type starting material and a substrate mixture of n-type GaAs-GaP, the transported source material deposits on the substrate as an epitaxial film about 0.1 mm. thick having the same single crystal lattice orientation as the substrate. The p-type film and n-type substrate form a p-n junction and exhibits rectification.

When thinner films are desired, the reaction time may be shortened by increasing the temperature differentials between the hot and cold zones and/or increasing the flow rate of the transport agent.

Example 6

This example illustrates the formation and deposition of an epitaxial film of GaP on an undoped n-type GaAs wafer as the substrate wherein the semiconductor components are sequentially contacted with the halogenated hydrocarbon transport agent and the reaction mixture then conducted from the reaction zone to the deposition zone.

A polished seed crystal substrate of undoped n-type GaAs having a net carrier concentration of $8\times10^{15}$ carriers/cc. and weighing about 2.9 gm. is placed in a vertical position in the deposition zone of a fused silica reactor. A quantity of elemental gallium contained in a crucible is placed in the high temperature reaction region of the reactor tube and a quantity of elemental red phosphorus is also placed in the same region of the furnace between the elemental gallium and the GaAs substrate. The reaction and deposition zones of the reactor tube are separately controlled by two furnaces butted end to end.

The substrate is first heated to 940° C. and a stream of hydrogen passed through the tube for 15 minutes to remove oxygen from the surface of the GaAs. A mixture of trichloroethylene carried by hydrogen is passed through a preheater where the trichloroethylene is heated to about 100° C. and partially decomposed. This mixture is passed into a U tube in dry ice-trichloroethylene slurry then introduced into the fused silica reactor tube and contacted first with the gallium at 700° C., thus reacting with and vaporizing the gallium. This reaction mixture is next contacted with the vaporized phosphorus and the entire complex reaction mixture is directed on through the reactor tube to the lower temperature deposition zone maintained at 625–650° C. where GaP deposits as a single crystal epitaxial film on the GaAs substrate. Point contact rectification tests show that a p-n junction is formed at the interface junction between the epitaxial layer and the seed crystal substrate.

The embodiment of the invention shown in this example may be suitably modified by interchanging the positions of the elemental gallium and phosphorus in the reaction zone. This modification is less preferred because a higher temperature is required, e.g., about 950° C., to cause the more volatile phosphorus to combine with the trichloroethylene. The deposition temperature of about 800° C. is also higher.

When this example is performed using components of II–VI semiconductors and appropriate temperatures similar results obtain. Thus, when elemental cadmium is substituted for gallium and tellurium is substituted for phosphorus, a reaction temperature of about 680° C. is used and the deposition temperature for CdTe is around 600°–625° C.

Example 7

This example illustrates the formation and deposition of an epitaxial film of p-type GaAs on n-type GaAs as the substrate according to the embodiment of the invention wherein the semiconductor components or reactive species are introduced into a common reaction zone from separate conduits.

A polished seed crystal of n-type GaAs weighing 2.88 g. and containing $5.8 \times 10^{18}$ carriers/cc. of tellurium dispersed therein is placed in a fused silica reaction tube located in a furnace. The GaAs seed crystal is placed in a silica support inside said tube. The reaction tube is heated to 700° C. and a stream of hydrogen is directed through the tube for 15 minutes to remove oxygen from the surface of the GaAs.

A stream of chlorobromomethane as transport agent is then directed through a reservoir of elemental gallium in communication with said reaction tube and maintained at about 800° C. thus reacting with and vaporizing the gallium. The gaseous reaction product is then conducted through a heated tube from the reservoir to the reaction tube containing the GaAs seed crystal.

Meanwhile, separate and equal streams of hydrogen are conducted through separate tubes containing in one of them a reservoir of arsenic trichloride heated to about 100° C. and in the other a body of zinc chloride dopant heated to about 360° C. From the heated tubes the arsenic trichloride and zinc chloride are carried by the hydrogen on through the tubes to the reaction tube. The separate streams of hydrogen carrying the vaporized $AsCl_3$ and zinc chloride conjoin with the chlorobromomethane-gallium reatcion mixture in the fused silica reaction tube where a reaction occurs in which a single crystal film of p-type gallium arsenide is formed on the cooler seed crystal of n-type gallium arsenide as an epitaxial layer which exhibits about $10^{18}$ carriers (hole) per cc. The seed crystal after 5 hours weighs 3.44 g.

X-ray diffraction patterns show that the deposited layer is single crystal in form and oriented in the same fashion as the substrate. Point contact rectification tests show that a p-n junction exists at the region of the junction between the epitaxial layer and the seed crystal substrate. Point contact rectification tests show that a p-n junction exists at the region of the junction between the epitaxial layer and the seed crystal substrate.

Example 8

The same procedure outlined in Example 7 is repeated but phosphorus trichloride heated to about 60° C. is substituted for the arsenic trichloride. In this example, a seed crystal of n-type GaAs weighing 1.45 g. and containing about $5.5 \times 10^{18}$ carriers/cc. of sulfur dispersed therein is used.

In the reaction tube, the vaporous chlorobromomethane-gallium reaction mixture, $PCl_3$, zinc dopant and hydrogen react to form p-type GaP which deposits from the vapor phase onto the seed crystal of n-type GaAs. The reaction is allowed to proceed for 1.5 hours, after which the product is removed from the reaction tube, weighed and is found to have increased in weight by 0.01 g. The crystal upon X-ray examination is found to consist of an overgrowth of single crystal p-type GaP having the same crystal orientation as the n-type GaAs substrate. The crystal exhibits rectification showing that a p-n junction exists at the boundary between the epitaxial overgrowth and the substrate.

When this example is repeated but using instead of the GaAs substrate an n-type CdTe substrate containing a net carrier level of about $10^{17}$ carriers/cc., p-type GaP deposits on the substrate. X-ray diffraction patterns of the product show that the deposited layer is single crystal in form and oriented in the same fashion as the substrate. Rectification tests show the presence of a p-n junction between the epitaxial layer and the substrate.

Example 9

This example illustrates the preparation of an n-type zinc telluride substrate having deposited thereon an epitaxial overgrowth of p-type mercury selenide.

The procedure described in the preceding example is repeated, except that the seed crystal used is n-type zinc telluride containing about $5.8 \times 10^{18}$ carriers/cc. of gallium dispersed therein. The reservoir containing the II element, mercury, also contains sufficient copper doping agent to dope the subsequently formed mercury selenide to a carrier concentration of about $1 \times 10^{17}$ carriers/cc. The VI compound used in this example is selenium tetrachloride. The tube containing the reservoir of selenium tetrachloride is heated to 160° C. while passing a stream of hydrogen therethrough, while the mercury and copper are heated to 320° C. in a stream of trichloroethylene. These separate gaseous streams containing the vaporized reactions are then conducted to the reaction tube which is heated to 250° C. and contains the zinc telluride seed crystal. Here, the vaporized reactants intermix and mercury selenide containing the copper doping agent dispersed therein deposits from the vapor phase onto the seed crystal.

Again, X-ray diffraction patterns of the substrate crystal show that the deposited layer is single crystal in form and oriented in the same manner as the substrate.

Rectification tests show the presence of a p-n junction as in preceding examples.

When this example is repeated using a wafer of silver chloride as the substrate instead of zinc telluride, the mercury selenide formed in the reaction deposits as an epitaxial film on the silver chloride substrate as shown by X-ray diffraction patterns. In like manner other I–VII compounds such as the fluorides, chlorides, bromides and iodides of sodium, lithium, potassium, rubidium and cesium may be used as substrates herein.

Various other modifications of the instant invention will be apparent to those skilled in the art without departing from the spirit and scope thereof.

What is claimed is:

1. Process for the production and vapor deposition of semiconductor compounds selected from the group consisting of III–V compounds and mixtures thereof and II–VI compounds and mixtures thereof, which comprises contacting at least one member selected from the group consisting of said compounds, components of said compounds and reactive species thereof with a halogenated hydrocarbon having from 1 to 10 carbon atoms in a first temperature reaction zone and subjecting the resulting gaseous reaction mixture to a temperature in a second temperature deposition zone sufficiently different from that in said first temperature zone to deposit therein a crystalline form of said semiconductor compound.

2. Process for the production and vapor deposition of an epitaxial film of at least one semiconductor compound selected from the group consisting of the nitrides, phosphides, arsenides and antimonides of boron, aluminum, gallium and indium and mixtures thereof and the sulfides, selenides and tellurides of beryllium, magnesium, zinc, cadmium and mercury and mixtures thereof of which comprises contacting at least one member selected from the group consisting of said compounds, components of said compounds and reactive species thereof with a halogenated hydrocarbon having from 1 to 10 carbon atoms in a first temperature reaction zone and subjecting the resulting gaseous reaction mixture to a temperature in a second temperature deposition zone sufficiently different from that in said first temperature zone to deposit an epitaxial film of said semiconductor compound on a substrate material selected from the group consisting of members of said semiconductor compounds, I–VII compounds, silicon and germanium.

3. Process according to claim 2 wherein said halogenated hydrocarbon has a halogen-to-carbon ratio within the range of from 1:1 to 4:1.

4. Process according to claim 3 wherein said halogenated hydrocarbon is trichloroethylene.

5. Process according to claim 3 wherein said halogenated hydrocarbon is carbon tetrachloride.

6. Process for the production and vapor deposition of an epitaxial film of at least one semiconductor compound selected from the group consisting of III–V compounds and mixtures thereof and II–VI compounds and mixtures thereof, which comprises contacting a crude source of said compounds with a halogenated hydrocarbon having from 1 to 10 carbon atoms and a halogen-to-carbon ratio within the range of from 1:1 to 4:1 in a first temperature reaction zone and subjecting the resulting gaseous reaction mixture to a temperature in a second temperature deposition zone sufficiently different from that in said first temperature zone to deposit an epitaxial film of said semiconductor compound on a substrate material selected from the group consisting of members of said semiconductor compounds, I–VII compounds, silicon and germanium.

7. Process according to claim 6 wherein said halogenated hydrocarbon is trichloroethylene.

8. Process according to claim 7 wherein said semiconductor compounds are III–V compounds.

9. Process according to claim 8 wherein said III–V compounds are gallium phosphide as the epitaxial film and gallium arsenide as the substrate material.

10. Process according to claim 7 wherein said semiconductor compounds are II–VI compounds.

11. Process for the production and vapor deposition of epitaxial films of semiconductor compounds selected from the group consisting of III–V and II–VI compounds which comprises combining in the vapor phase (1) a gaseous mixture formed by the reaction of a halogenated hydrocarbon having from 1 to 10 carbon atoms and a halogen-to-carbon ratio within the range of from 1:1 to 4:1 and the less volatile component(s) of at least one of said semiconductor compounds and (2) a gaseous mixture of hydrogen and the more volatile components(s) of said semiconductor compounds and contacting the resulting reaction mixture with a substrate selected from the group consisting of I–VII, II–VI and III–V compounds, silicon and germanium in a deposition zone maintained at temperature sufficiently different from those in the reaction zone to deposit an epitaxial film of said semiconductor on said substrate.

12. Process according to claim 11 wherein said halogenated hydrocarbon is trichloroethylene.

13. Process according to claim 12 wherein said semiconductor compounds are III–V compounds.

14. Process according to claim 13 where the epitaxial film is GaP and the substrate is GaAs.

References Cited

UNITED STATES PATENTS

| | | | |
|---|---|---|---|
| 2,980,500 | 4/1961 | Miller | 23—204 XR |
| 3,148,094 | 9/1964 | Kendall | 148—175 |
| 3,224,911 | 12/1965 | Williams et al. | 148—175 |
| 3,226,270 | 12/1965 | Miederer et al. | 148—174 |
| 3,312,570 | 4/1967 | Ruehrwein | 148—175 |
| 3,312,571 | 4/1967 | Ruehrwein | 148—175 |
| 3,342,551 | 9/1967 | Dötzer | 252—62.3 XR |
| 3,392,066 | 7/1968 | McDermott et al. | 148—175 |

L. DEWAYNE RUTLEDGE, Primary Examiner

PAUL WEINSTEIN, Assistant Examiner

U.S. Cl. X.R.

117—106, 107.2, 201; 23—204; 148—1.6, 174; 252—62.3